Nov. 25, 1952     J. R. PATTEE ET AL     2,618,861
THREAD GAUGING APPARATUS
Filed July 2, 1948     3 Sheets-Sheet 1
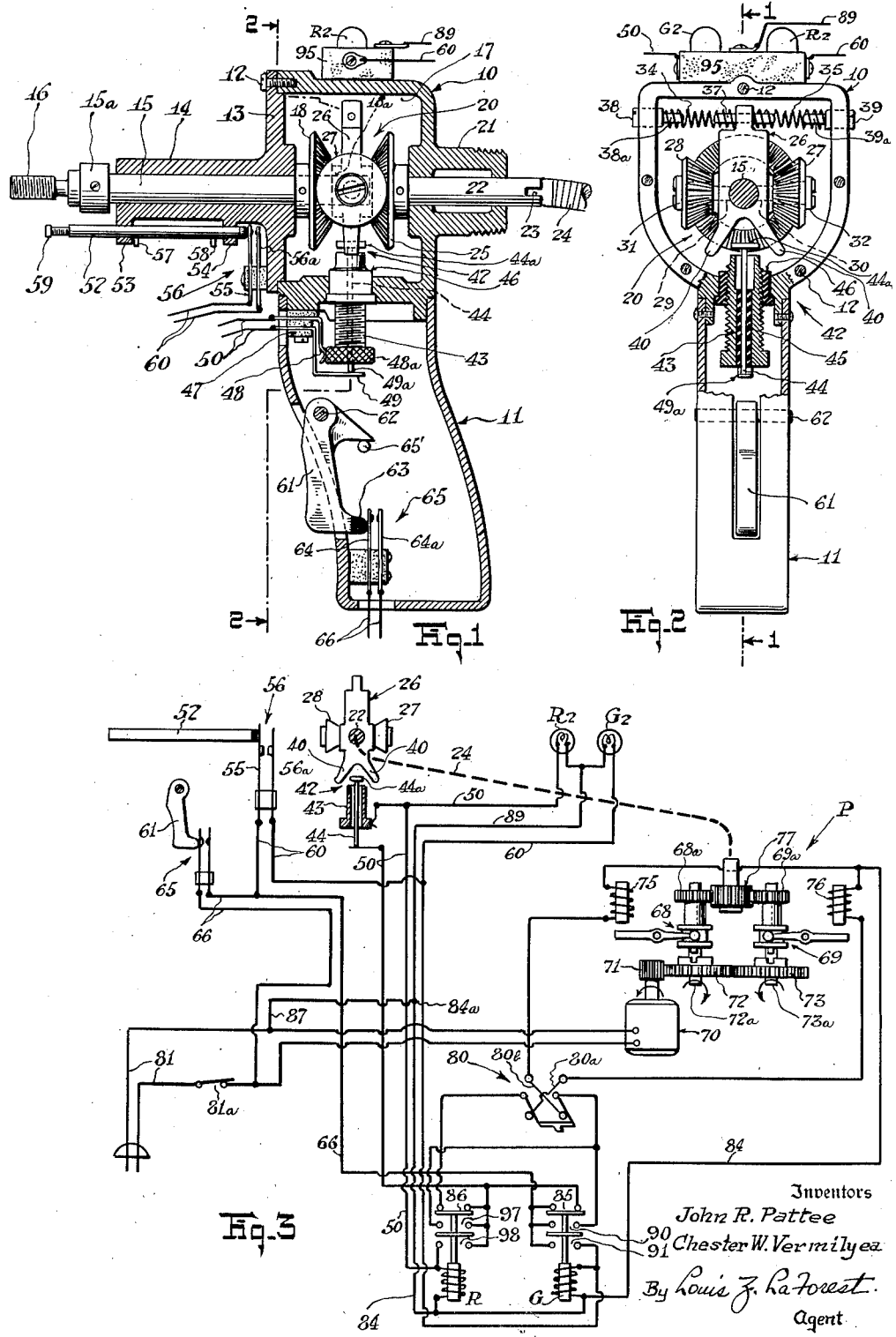
Inventors
John R. Pattee
Chester W. Vermilyea
By Louis F. LaForest
Agent Nov. 25, 1952  J. R. PATTEE ET AL  2,618,861
THREAD GAUGING APPARATUS
Filed July 2, 1948  3 Sheets-Sheet 2
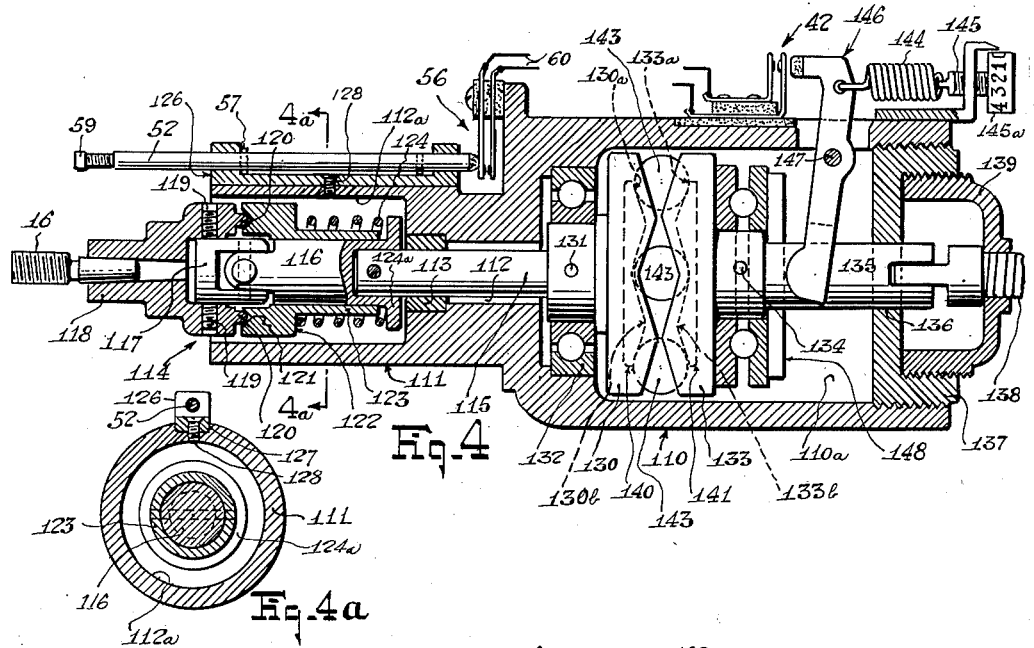
Fig. 4
Fig. 4a
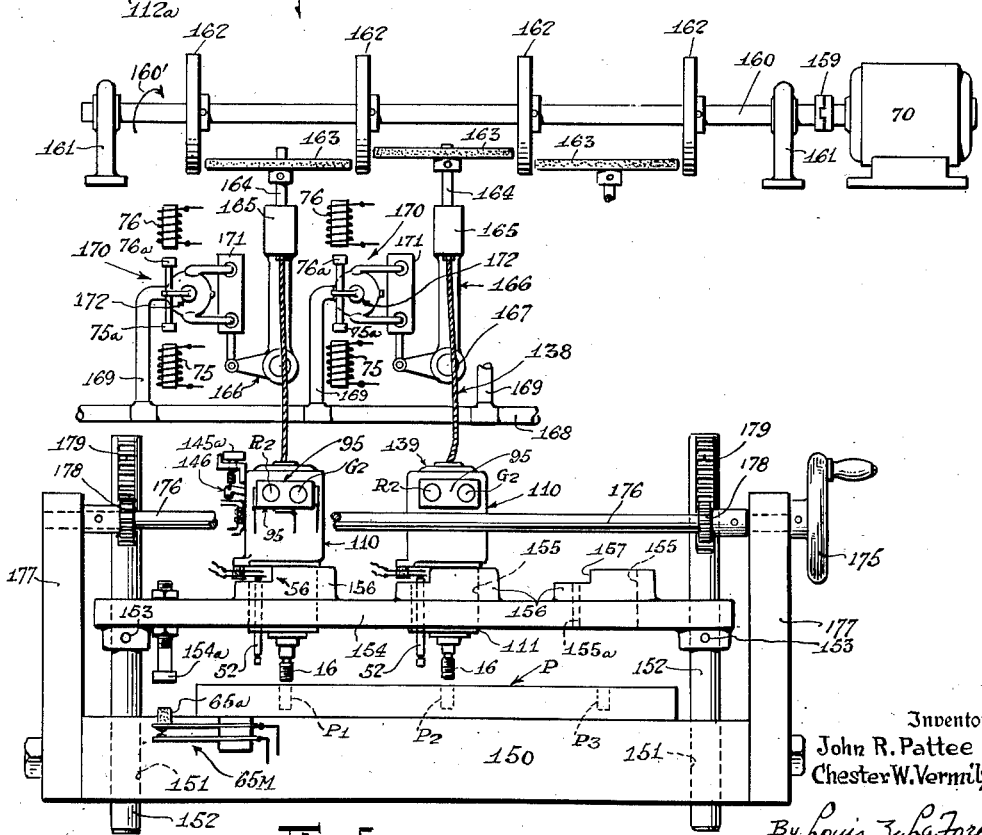
Fig. 5
Inventors
John R. Pattee
Chester W. Vermilyea
By Louis Z. LaForest
Agent

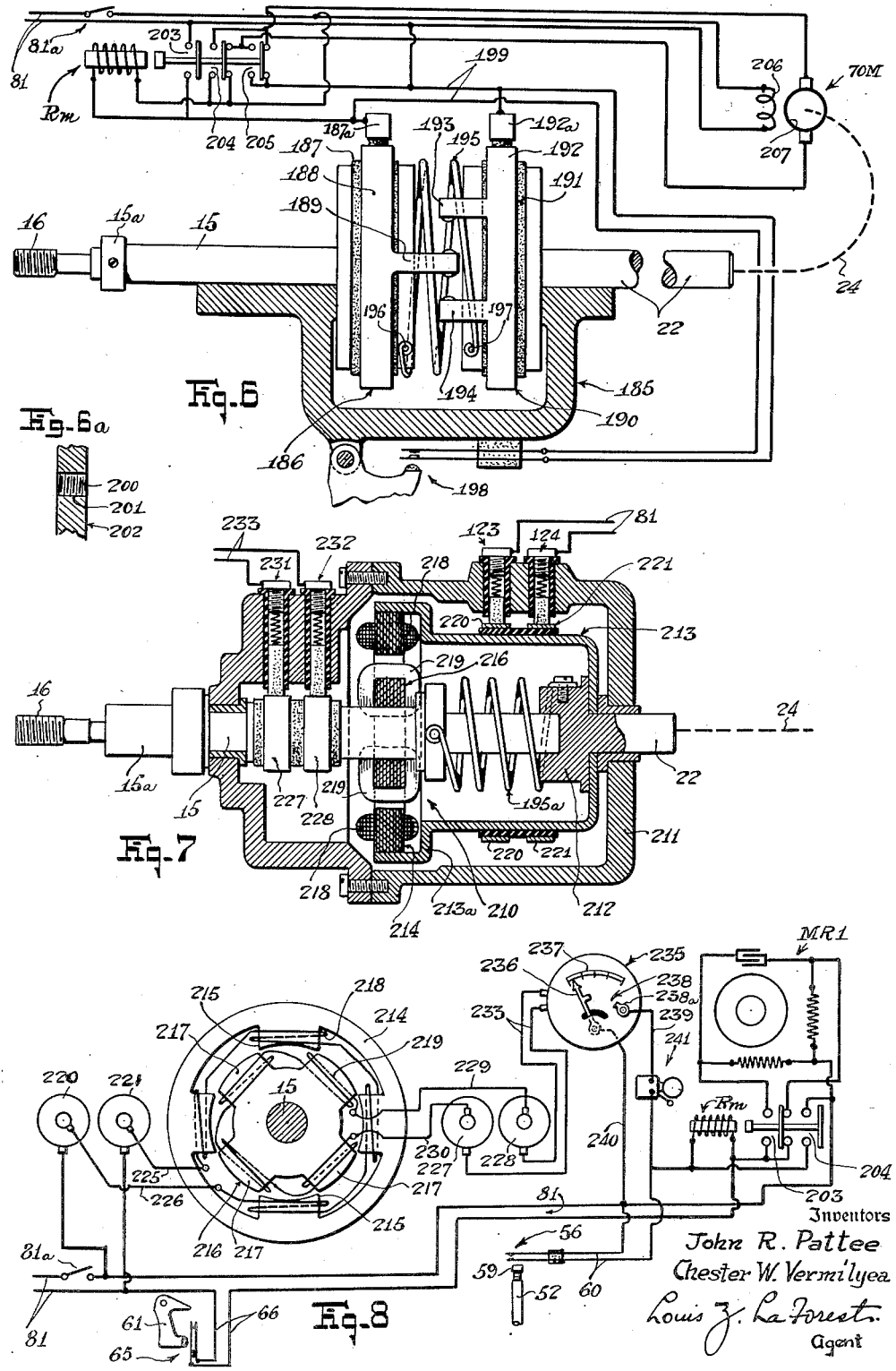

Patented Nov. 25, 1952

2,618,861

UNITED STATES PATENT OFFICE 2,618,861

THREAD GAUGING APPARATUS

John R. Pattee, Madison, N. J., and Chester W. Vermilyea, Middletown, Conn.

Application July 2, 1948, Serial No. 36,646

7 Claims. (Cl. 33—199)

Our invention relates generally to gauging machines, and more particularly to a power-driven machine or apparatus for gauging threads that are cut or formed by means of taps or dies, such as the threads formed on bolts or studs, or in holes.

In the manufacture of machines, parts or machines, tools and the like which often require a number of tapped or threaded holes therein, it is important to know when a thread-cutting tap has worn to a size which no longer cuts a standard or accurate thread, that is a thread within the established limits. This is true and of still greater importance when the manufactured products are of a nature demanding the ultimate in accuracy and dependability of workmanship. As an example, in the production of airplane engines and their related parts, it is in most cases necessary to carefully inspect every tapped or threaded hole. In view of the mass production of these products, it is clear that such a careful inspection requires a very considerable amount of time and is a problem to cope with. In the past, the task has been done by inspectors who manually screw precisely threaded plug-gauges into the holes, and then withdraw or unscrew the same therefrom. An inspector must decide by the "feel" of the fit of the gauge in the hole whether to pass or not to pass the work. This form of operation is slow, tedious and requires application of skill and judgment. Naturally, the same situation exists in the case of exteriorly cut threads, such as on bolts and studs, which may be inspected by means of the so-called ring gauges.

Accordingly, it is a main object of our present invention to provide a practical, time-saving thread gauging apparatus or machine, that is one which has a power-driven gauging element associated with a sensing mechanism which is effective accurately to determine whether the work is correct or incorrect, thus precluding any error of human judgment.

A further object of the invention is to provide, in a device of the above character, novel means for clearly indicating the condition of the work that is being gauged.

A further object is to provide a hand-held, lightweight gauging machine; one which has a pistol grip and a trigger switch for effecting certain initial operations.

A further object of our invention is to provide, in connection with a rotary thread-gauging element, a plurality of control means effective automatically to reverse the direction of rotation of the said element at different times, or in accord with the conditions met by the said element during the operation of gauging the work.

A still further object is to provide novel means and method for supporting a plurality of thread-gauging machines in a single support and in a manner whereby the same may be advanced upon the work simultaneously to engage respective threads, and yet remain subject to retraction individually in accord with the conditions met in the threads associated with each of said machines.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily in the appended claims.

In the drawings, wherein like reference characters refer to like parts throughout the several views:

Figure 1 is a vertical sectional view of a device embodying our invention; this figure is taken along the line 1—1 of Figure 2;

Figure 2 is a sectional view taken along the line 2—2 of the device of Figure 1;

Figure 3 is a combined diagrammatical showing of the main operating parts of the device of Figure 1, and the associated electrical means which contribute to control the operation of said device;

Figure 4 is a modified form of our invention;

Figure 4a is a detail taken on line 4a—4a of Figure 4;

Figure 5 is a view of an apparatus in which the device of our invention may be mounted and used in multiple, such as by one operator;

Figure 6 is a further modification of the device of our invention, particularly to show a mode of operation of the same;

Figure 6a is a detail of the work-piece upon which the device of Figure 6 is intended to operate.

Figure 7 is a still further modification of our invention; and

Figure 8 is a wiring diagram of the electrical means employed in our modified device of Figure 7.

With reference to Figures 1, 2 and 3, there will be seen a gauging apparatus comprising a frame 10 having a downwardly extending portion or handle 11 made in the form of a pistol grip to provide ease of manipulation of the apparatus. Secured to the front portion of the frame 10, as by screws 12, is a plate 13 having a centrally located long bearing 14 in which is journalled a spindle 15. The forward end of the spindle or shaft 15 has a chuck 15a for retaining a thread-gauge element 16. The frame 10 has an inner chamber 17, and a bevel gear 18 is secured to the inner end of the spindle 15. Gear 18 is adapted to form the driven sun-gear of a differential gearing mechanism 20, next to appear, and for use in sensing the torque resistance imposed upon the rotary gauge element 16 aforementioned. In substantial alignment with the spindle 15, and journalled in a boss 21 at the rear of the frame 10, is a drive shaft 22. This shaft has at its outer end a slot 23 adapted for engagement with the end of a flexible power shaft 24 which may be connected to any suitable source of power, but preferably of the type shown in Figure 3, which is hereinafter more fully described. A bevel sun-gear 25 secured to the inner end of this shaft is located in juxtaposition with respect to the gear 18. The driven shaft 15 extends inwardly beyond its respective gear 18 to form a stub 18a upon which is freely mounted an element 26 adapted for the support of a pair of bevel pinions 27 and 28, each meshing with the teeth of the sun gears 18 and 25. As best seen in Figure 2, the element 26 is normally held in a vertical position so as to hold the pinions in a horizontal position as shown. For this purpose the element 26 has threaded holes 29 and 30 into which are threaded respective stub shafts 31 and 32 adapted freely to support the pinions 27 and 28 respectively. With the gearing arrangement just described, it will be seen that if rotation, in any direction be imparted to the sun-gear 25, the pinions 27 and 28 will serve to transmit the rotation of the same to the other sun-gear 18. Thus rotation of the shaft 22 will cause rotation of the shaft 15. However, if torque resistance be imposed upon the shaft or spindle 15, the pinions will have a tendency to move around with the gear 25, thus permitting the shaft to lag by an amount depending upon how freely the element 26 which carries the pinions is able to rotate against the restraint of the spring 34 or 35. In our invention, we normally hold the element 26 in its vertical position, against a free movement, by means of the balancing springs 34 and 35. These spring members are held in position by a transverse pin 37 fitted across the upper end of the member 26, and by respective pilot pins 38a and 39a, extending from respective adjustable screws 38 and 39 threading in the wall of the casing 10. The springs 34 and 35 are of the compressive type and carefully chosen to provide a predetermined resistance against a rotational movement in either direction of the member 26, so that any torque resistance imposed upon the gauge element 16 will be effective to cause a movement of the element 26 against its retaining or balancing springs 34 and 35.

Below the member 26, there is provided a switch designated generally as 42. It comprises an outer tubular contact element 43 and a flexible central contact element 44 insulated from the first by the insulation 45. The contact 43 is threaded in an insulation 46 rigidly secured at the base of the frame 10, and thus said contact may be adjusted as to height. The upper end of the contact 44 terminates in the form of a head 44a resting at equal distances between a pair of fingers 40 downwardly extending from the aforementioned member 26. A stack 47 of insulation material is mounted to the base of the casing 10 and serves insulatedly to hold a pair of blades 48 and 49, respectively making contact at 48a with the contact 43 and 49a with the contact 44.

The fingers 40 of the element 26 are adapted to flex, when the said element is turned in either direction, the stem of the element 44 so as to make contact with the tubular element 43. The outer ends of the blades form the terminals of the control switch 42, and these contacts are connected in a lead 50 which is connected to a relay R, and to a signal light R2 hereinafter more fully described.

Longitudinally extending below the bearing 14 is a depth-bar 52 adapted for sliding movement in the bosses 53 and 54, and normally urged to its most forward position—that which is shown in the drawing—by a spring blade 55 of a switch 56. The bar 52 is restricted in its movement by the cross pins 57 and 58, and it has at its forward end an adjustable feeler element 59, the purpose of which is to determine the depth to which the gauge element 16 is to enter the threaded hole before said element is automatically reversed in its rotation quickly to be withdrawn therefrom. The object is to cause the feeling element to abut against the face of the work and be moved rearwardly to cause the blade 55 to make contact with its companion blade 56a included in leads 60 connected to a relay G and a signal light G2 shown in the diagram of Figure 3 and later to be more fully described.

Forward of the pistol grip extension 11, there is mounted a trigger member 61, which is pivoted at 62 and which has a lower rear insulation 63 contacting with a spring blade 64 of a switch 65. Normally, the trigger is held or urged by the spring blade in the position shown, wherein a pin 65' fitted in the frame limits the blade action. When the trigger is pulled against the force of the blade, it closes the switch 65 by causing the blade 64 to move in contact with a companion blade 64a. The switch 65 is mounted in a lead 66 which forms a portion of a main circuit hereinafter to be described. The closing of the switch energizes the circuit to cause rotation of the shaft 24. The direction of rotation of the shaft is determined by selective means provided in the aforementioned circuit and whereby, when the circuit is energized, there will be effected a selection of one or the other of a pair of clutches 68 or 69 associated with a motor 70. The preferred form of power means we employ to drive our apparatus includes the motor and clutches just mentioned and appears in Figure 3.

As seen, the power means is generally indicated as P, and it is shown as including the pinion 71 which drives the gears 72 and 73 so as to turn these in opposite directions as indicated by the arrows. These gears are secured to respective drive shafts 72a and 73a associated respectively with the aforementioned clutches 68 and 69. These clutches are operated selectively by respective solenoids 75 and 76 which are initially selectively energized through the lead 66 of the trigger switch 65. The selection of a clutch 68 or 69 determines the initial direction of rotation of the flexible shaft 24 and thus of the gauge elements 16. For this purpose the clutches are associated each with a respective pinion 68a and 69a meshing with a gear 77 secured to the shaft 24.

The present invention contemplates first to select the direction of rotation of the spindle or of the gauge element 16—as for inspecting a right or a left-hand thread—then to provide a plurality of means effective automatically to reverse the selected direction of rotation. To this end, there is provided a master switch 80 shown in the wiring diagram of Figure 3. This switch is a double-pole double-throw reversing hand-switch which when thrown to a select side thereof will determine which of the clutches 68 or 69 will initiate the rotation. Then, when one of the plurality of reversing means becomes effective, the first engaged clutch will be disengaged and the other engaged resulting in a reversal of the initial order. In the drawing, the switch 80 is shown in a position for engagement of the clutch 69 first, and thus to cause rotation of the shaft 24 and spindle 15 in a clockwise direction to inspect a right-hand thread. The automatic reversal means will then operate as follows:

Assuming that the power line 81 be connected and switch 81a thereof closed and thus the motor 70 be running idly; also, that the master switch 80 be in the position last stated, then, the frame 10 of the present apparatus is moved forward by hand onto the work-piece to bring the gauge element 16 thereof in contact with the thread. It is to be understood that the thread is one formed in a hole of a work-piece or of a component of any sort, which need not be shown herein. The trigger 61 is now pulled to close the switch 65 and cause current to flow through lead 66, across the gap 85 of the relay G and across the top gap 86 of the relay R, then through the connection 80a of the selector switch 80, then through the solenoid 76 and back through a lead 84, the junction 84a, and lead 87 forming the other side of the power line 81. This will cause an engagement of the clutch 69 and subsequent clockwise rotation of the spindle and gauge element to cause the latter to move into the thread. As this operation continues without undue friction upon the element 16, the forward portion 50 of the depth-bar 52 will eventually come into contact with the face of the work-piece and then cause a closing of the switch 56 thereof. As this is effected, the current flowing into the lead 66 will be made to flow through the lead 66 and into the coil of the relay G, then back through the lead 84. The relay G will therefore be energized to cause an opening of the gap 85 and an instant closing of the adjacent gaps 90 and 91 thereof. This, then, will cause the solenoid 76 to be deenergized to release the engagement of the clutch 69, but simultaneously cause current to flow through gap 90, connection 80b of the switch 80 and solenoid 75; the current returning via the leads 84—87. This will cause a reversal of the rotation of the gauge element and its subsequent withdrawal from the thread of the hole. During this phase of the operation of the present apparatus, the trigger switch is kept closed, and, although the switch 56 of the depth-bar is soon reopened, the current will nevertheless continue to flow through the lead 66 and gap 91, keeping the relay magnet G energized, then through that portion of the lead 60 which is extended and connected with the signal light G2. This signalling means therefore becomes effective as soon as the reversal means is operated and remains effective throughout this phase of the operation. In fact, the signal remains "On" until the trigger switch is released to re-cycle the apparatus.

As shown in the drawing, the signal light G2 may be mounted in a suitable insulation block 95 which is secured to the top portion of the frame 10. The signal is thus readily visible at all times, and, for the purpose of distinct indication, the light or the bulb thereof is colored green to bring forth to the operator the thought of a "Go" condition, or a correct thread. Mounted in the same block, and wired as is shown in the diagram of Figure 3, is a red light forming the signal previously mentioned as R2. This signalling means is rendered effective when the reversal means is operated in response to another condition, that is operated, in response to the closing of the switch 42 due to a yielding movement of the coupling mechanism 20. This means of reversing the rotation of the tool or the gauge element is as follows:

After the trigger 61 has closed the switch 65 and the gauge element 16 has begun to advance along the thread, if the latter be undersized or improperly cut, then the switch 42 will be closed by the element 26 in the manner previously described. Then the current of the lead 87 will flow down through the lead 84, coil of the relay R up through the lead 50, through the switch 42 down the lead 50 through the gap 85 and return through the switch 65 and lead 66. This will energize the relay R and open the gap 86 thereof, thus releasing the clutch 69. At the same time the gaps 97 and 98 will be closed. Then the current will flow through the gap 97, connection 80b of the switch 80 and through the solenoid 75, thus causing a reversal of the rotational direction of the gauge element 16. During the ensuing withdrawal of the element, the switch 42 will have been open but current will nevertheless flow from the lead 66 through the gap 85 and then through the gap 98, then up through the lead 50, signal light R2 and common branch 89, causing the red light R2 to remain "On" throughout the withdrawal operation and thus indicate to the operator that the thread is incorrect. Again, release of the trigger will establish a condition of normalcy of the apparatus.

As stated above, current to energize relay R and light R2 must pass through gap 85 of relay G. Therefore, if relay G has been operated first, by the closing of depth-bar switch 56, relay R and light R2 cannot subsequently be operated until a new cycle of operations is started. This circuit arrangement prevents the light R2 from giving false signals, such as might be caused by accidental sticking of the gauge during withdrawal.

It is readily conceivable that the apparatus just described may be desirable for use, in certain cases, in multiple. For example as in a multiple spindle press, such as is shown in Figure 5. Accordingly we show in Figure 4 a modification of our apparatus for this particular use. In this modification, the controlling wiring diagram is effectively the same, only that it is in multiple for controlling multiplicity of apparatus thereshown. For this reason the same reference numerals are used to identify the corresponding parts wherever possible.

There is seen in Figure 4 a frame 110 having a forward cylindrical extension 111 (see also Figure 4a). This extension has a bore 112 provided with a bearing 113 for the spindle 115. In this embodiment, the spindle is shown provided with a centering device generally indicated at 114 and which is housed in an enlargement 112a of the bore 112. This centering means comprises, in effect, a universal joint composed of the portions 116 and 117; the first being an extension of the spindle and the second being a pivoted element common in the art. Both these portions are jointed at right angle by the respective pins shown, and the forward one, 117, has secured to it the chuck member 118 which is held thereto by the screws 119. The chuck carries the thread -gauge element 16 of the previous description. The inner face of the chuck 118 is formed with an annular ridge 120 complementing an annular groove 121 made in the face of an enlarged portion 122 of a sliding bushing 123 urged by a compression spring 124 lodged between it and a flange 124a depending from the rear of the extension 116. The force of the spring 124 serves to hold the plug-gauge 16 centered with the spindle 115 as will be understood. Mounted along the cylindrical extension 111 is the depth-bar 52, generally the same as in the previous description and adapted to operate to close a switch, such as 56. In this case the bar is mounted in a bracket 126 held to the cylinder by means of the groove 127 and the screw 128, better seen in Figure 4a. All other details of this bar are numeralized as in the previous showing, and its purpose is to close the associated switch 56 when the gauge element 16 has bottomed the hole so as to cause its withdrawal therefrom by effecting a reversal of the direction of rotation of the spindle, as hereinbefore explained.

In this embodiment, we have chosen to illustrate a different form of torque sensing means. It comprises a flange or disk 130 secured, as by the pin 131, to the inner end of the spindle 115. This disk is housed in a chamber 110a of the frame, and it is adapted to bear against a thrust bearing 132 fitted into a recess at the forward end of the chamber 110a of the frame. On the right or complementing the disk 130 is another disk 133 secured, as by the pin 134, to a shaft 135 which constitutes the drive shaft for the spindle. The drive shaft 135 is journalled in a bearing 136 made in a plug 137 threaded to the frame 110 as shown, and is rotated by a flexible cable or shaft 138 in a manner later to appear; this last shaft being held in position for rotation by the threaded end-piece 139, as is shown in the drawing. The torque sensing means hereof comprises a race-way 140 in the face of the disk 130 and a similar race-way 141 in the disk 133. Each raceway is formed with pronounced radial corrugations, that is a series of radial furrows and ridges, as is shown in the drawing. There are four such furrows and four such ridges in each of the disks or flanges, and they are numeralized respectively 130a and 130b for the disk 130 and 133a and 133b for the disk 133. It is to be understood that the elevational view of the drawing is such as to show only three of these furrows and two of the ridges, however, it is sufficiently clear to see that they are placed 90 degrees apart. In each of the depressions, there is placed a hardened ball 143 as shown. These balls are normally held in the low complementing portions 130a and 133a of each of the disks by a strong spring 144, stretched between an adjustable screw 145 and a bifurcated member 146, which is pivoted to the frame at 147, the lower bifurcated end of this member bearing against a thrust bearing 148 abutting against the rear of the disk 133. The arrangement is such that the force of the spring 144 will effect, for all intents and purposes, a torque coupling of the shaft 135 with the spindle 115 so that rotation of the former will cause rotation of the latter. However, when torque resistance is imposed upon the spindle, there is a tendency for the balls to spread the disks apart—due to the lag of the spindle or disk 130—so that disk 133, bearing 148, and shaft 135 are thrust backward, as will be readily understood. This will cause a rocking movement of the pivoted member 146 so that its upper end moves toward and closes a switch 42 which is effective for the purpose before described. In order to adjust the amount of torque resistance required to close the switch 42, the screw 145 has a head 145a which is calibrated in a manner to adjust the pull of the spring 144.

As previously stated, the device above described is intended for use in multiple, and for this purpose, the apparatus of Figure 5 is provided. This apparatus comprises a bed-plate 150 which may be supported on legs or on a bench as desired. At the four corners of this plate, there are provided guide holes 151 for receiving the reciprocating rods 152 to which is secured, as by the pins 153, the master plate 154 which may be cast, en bloc, and suitably machined to support the several devices of our invention. In the illustrated apparatus, there is shown a capacity of three such devices. Each is mounted for support and guidance in a bore 155 made through a respective boss 156 and also through the plate 154 itself as indicated. This bore 155 is adapted to receive freely the cylindrical portion 111 of a device so that the same may be moved up or down in said bore; the movement being effected in a manner hereinafter understood. In order to orient or prevent rotation of the device in the bore, there is provided a key-way 155a into which the bracket 127 of the depth-bar is fitted; there being a cut-away portion 157 in the boss to clear the switch 56, as clearly seen from the drawing.

The power means is common to all devices and comprises the motor 70, coupled by a clutch 159 to main shaft 160 which is supported by the bearings 161 there shown. Since all the flexible shafts 138 of the devices are adapted for rotation in both directions, there are provided on the shaft 160 a series of spaced disks or frictional pulleys 162. These are arranged in a manner to be engaged by respective wheels 163; one for each of the shafts 138. Each drive wheel 163 is pinned to a stub shaft 164 which is journalled in a bearing 165 swingingly supported at the upper end of a bell-crank lever 166 pivoted at 167 to any suitable stationary frame, not shown. The lower end of each stub shaft 164 is secured to a respective shaft 138, which leads flexibly to a respective shaft 135 of a respective device as above described. The manner of rotating the shafts 138—that is in one direction or the other—is effected by swinging the aforementioned crank members 166 to one side or the other to cause a respective wheel 163 thereof to engage the face of one or the other of its adjacent drive pulleys 162. For example, if the main shaft 160 be turning in the direction of the arrow 160', and one of the arms 166 be swung to the right so that its respective wheel 163 will engage the adjacent right-hand disk 162, then rotation will be imparted to its shaft 138 in a clockwise direction. Reversely, if the arm be swung leftwardly, the wheel 163 will engage the adjacent-left-hand disk 162 and rotation of the shaft 138 will be in an anti-clockwise direction. While several forms of means may be utilized for effecting rocking movement to the arms 166, we have shown an hydraulic system including the main pipe-line 168. This line has the branches 169 leading to a respective hydraulic station 170 for each of the devices; only two such stations being here shown. Each station has a piston 171 and a two-way valve 172 as shown. This valve is operated, one way or the other, by the solenoids 75 and 76 of the previously described diagram of Figure 3; there being duplication of the circuits which include the leads 50 and 60 so that each device can be operated individually as will be understood. For the operation of the valves, each is provided with the armatures 75a and 76a. In the present embodiment, the switch, such as 65 previously operated by the trigger 61, is indicated as 65M and it is common for all of the devices. This switch is mounted on the bedplate 150 in the position shown and it has an operating button 65a adapted to be contacted by an adjustable set-screw 154a mounted in the plate 154, so that said switch will be closed by said plate when all of the multiple gauging devices are brought down to their lowermost gauging position by the plate 154. The downward movement of the plate 154 is accomplished by a hand-drive which includes the handwheel 175 secured to a transverse shaft 176 journalled in the side standards 177 of the bed plate 150. A pair of pinions 178 secured to the shaft 176 is provided to mesh with respective racks 179 made into the front guide rods 152 aforementioned.

Each of the devices, above described, has its respective signaling means as shown in the drawing, and each such means is operated individually in accordance with the conditions met by each gauging element 16 during a multiple-gauging operation which may now be described as follows:

Let it be assumed that a work-piece P be placed in a suitable position on the bed 150 and that the handwheel 175 is turned clockwise to move the plate 154 down to its lowest necessary point for gauging the threads of the holes $P_1$, $P_2$ and $P_3$ there shown. Such a movement will cause the set-screw 154a to contact and close the switch 65M and thus energize all of the solenoids 76 to cause the arms 166 to tilt rightwardly and engage their respective wheels 163 with the latter adjacent right-hand disks to turn all the flexible shafts 138 clockwise. At this time, all of the devices are in what may be termed their upper positions, due to the fact that they are all held in their respective bores 155 in the plate 154 by gravitational force. When the plate 154 is lowered, each of the devices is automatically arrested in its downward movement by its respective gauge element 16 when the same contacts the work-piece P. As all the shafts 138 are so turned, all of the gauge elements will enter into their respective holes and, if all threads be correct, all depth-bars 52 will effect closing of their respective switches 56 and subsequent de-energization of the solenoids 76, and their simultaneous energization of the solenoids 75. The shafts 138 are now rotating reversely, and this will cause a withdrawal of all of the gauge elements 16 and also an indication of correctness of the threads on all of the signal lights R2. It is to be understood that the plate 154 remains down during this last operation and that each device is moved up independently of the plate by the screw-action of its respective gauge element as the same is withdrawn from the work-piece. It is only after there is a signal showing on or at all of the devices, that the operator may turn the wheel 75 to move the plate 154 upwardly to its original position.

During an operation such as the above, if there be an incorrect thread in any one of the holes mentioned, the gauge element associated with the said incorrect thread will cause a lag of its spindle 115 and the associated sensing mechanism thereof will automatically close the respective switch 42. Accordingly, the device associated with said thread will move upwardly before the others and indicate an incorrect thread by displaying the red signal G2 hereinbefore described.

It is to be understood that either the solenoid 75 or 76, associated with a gauging-head of the character above described, may be selected for initial operation when the switch 65M is closed by the downward movement of the main plate 154. This may be done by using a switch, such as 80 in Figure 3, with each of the said gauging-heads. Thus the respective shaft 138 of each of said gauging-heads may be initially selectively rotated in one direction or the other, and of course subsequently reversed in the manner explained with the device shown in said Figure 3. Thus, by employing a switch 80 with each of the above gauging-heads, the present multiple gauging machine may be used to gauge left-hand and right-hand threads simultaneously.

In Figure 6, there is shown a simplified form of our invention; one wherein the depth-bar may be omitted if desired, and also wherein the sensing mechanism may be reduced to a simple form. In this example, the frame is arbitrarily shown as 185. There, the gauge element 16 is mounted to the spindle 15 in the usual manner, and said spindle has secured to its inner end a disk 186. The disk has a peripheral insulation 187 onto which is suitably secured a collector-ring 188 having a laterally extending finger or pole member 189, as shown. Secured to the complementary end of the drive shaft, such as 22, is another disk 190 having the insulation 191 onto which is secured the collector-ring 192 which has two fingers or pole members 193 and 194. These are extended in the path of rotation of the pole member 189 so as to be contacted by the same in a manner to form, in effect, a single-pole double-throw switch. Normally the disks 186 and 190 are held in respective angular positions by a torsional spring 195 held at its ends by pins 196 and 197 respectively secured to the disks in the manner shown. When so held, the pole member 189 on the disk 186 is at an equal distance from the pole members 193 and 194, and thus when the drive shaft 22 is rotated, the same will rotate the spindle through the medium of the spring 195 without substantially disarranging or effecting any change in the distance of the pole element 189 from the other two poles mentioned. However, if a rotational resistance be imposed upon the gauge element 16 to cause the spindle to lag, then the pole member 189 will move into contact with one or the other of the poles 193 or 194, according to the direction of the rotation of the drive shaft. When such a contact is made, a pair of brushes 187a and 192a, suitably insulated from the frame, will serve to effect a closing of a circuit 199 for controlling a relay Rm hereinafter again mentioned.

Often, the threads to be inspected are of the type made in a hole passing through the work-piece. For example, a thread such as is illustrated in Figure 6a. In such a case, it may be desirable to eliminate the use of a depth-bar such as the bar 52 previously described and to effect the performance of the withdrawal of the gauge by reversing the rotation of the spindle by a willfull action, such for instance by closing a trigger-switch 198, which has been shown herein diagrammatically and mounted to the frame 186. In this device, our signalling means may also be dispensed with, since as will be understood, a correct thread will permit the advancement of the gauge element clear through the threaded hole, and the action of operating the trigger switch 198 will of itself indicate that the thread is correct. On the other hand an incorrect thread will effect an automatic reversal of the spindle and thus clearly indicate an odd condition of operation. For a clearer understanding of the operation of the present arrangement, an operational review of the same now follows:

The switch, such as 81a, of the power line 81 is closed to cause the motor 70m directly to turn the flexible shaft, such as 24, and thus rotate the drive shaft 22. The frame 186 of the device is brought forward to engage the gauge element thereof with the thread 200 of the hole 201 in the work-piece 202, see Figure 6a. If the thread be of proper size or correct, the element 16 will move clear through the plate 202 and, consequently, the operator will have to press the trigger switch 198 in order to withdraw the tool. What occurs when this switch is closed follows: The circuit 199, heretofore mentioned, is closed to energize the relay Rm, which when energized automatically holds itself operated by the now closed gap 203 thereof. And, through the closed gaps 204 and 205 reverse the polarity of the armature 207 of the motor 70M. After the gauge element is withdrawn from the work, the operator is then required to open the switch 81 and subsequently close it again for a repeat operation. With this device, if the thread be incorrect the gauge element will develop a resisting torque upon the spindle to cause the switch formed by the finger 189, to close the circuit 99 and thus effect automatically what is normally done by manipulation in the manner just described. The operator, therefore, will notice that the gauge does not fit; which he will understand as an incorrect thread. He will of course have to re-cycle the switch 81 before commencing another gauging operation.

We show in Figures 7 and 8 a further modification of our invention, particularly to show a sensing mechanism which is capable of progressively indicating to the operator the resisting torque of the spindle when an incorrect thread is met during a gauging operation. For example, when a gauge element enters a thread, there is always produced a resisting torque on the spindle, but it rises and rises to a point of effecting an automatic reversal when an incorrect thread is met. In the instant device, we measure the resisting torque in every instance of gauging, and if the resisting torque reaches a predetermined amount, then it causes an automatic reversal of the spindle of the apparatus. Such a torque sensing and indicating means is shown generally at 210 in Figure 7. It is enclosed in a frame 211, which, for purpose of brevity is shown in cross-section and without provision for the mounting of a depth-bar or for the handling of the same by a pistol grip thereof. Entering from the rear, is the drive shaft 22, and from the front is the spindle such as 15. Both these shafts are connected by means of a torsional spring such as 195a, in the manner shown. Secured to a flange 212 of the shaft 22 is a cylindrical housing 213 having at its forward end an enlarged portion 213a in which is fitted a field-core 214 having salient poles 215 thereof. At the inner end of the spindle 15, there is provided an armature core 216 having the legs 217, see particularly Figure 8. Serially wound about the poles 215 of the core 214 is a field winding 218, and about the poles 217 is an armature winding 219. Normally the torsional spring 195a holds the shaft 22 and spindle 15 at such an angular position, with respect to one another, that the poles of the cores 215—217 hold their respective windings in non-inductive relation—for instance, as is clearly indicated in Fig. 8.

Associated with the field winding is a pair of collector-rings 220 and 221. These are in turn associated with a pair of brushes 123 and 124 insulatedly supported in the frame and connected across the line 81 as shown; the collector-rings being connected by the leads 225 and 226 to the winding 218 as shown. Associated with the winding 219 of the core 216 is a pair of collector-rings 227 and 228, electrically connected by the leads 229 and 230 to said winding and respectively contacted by the brushes 231 and 232 which are connected in a circuit 233 serially including a meter, such for instance as a volt-meter indicated at 235. This meter has a pointer 236 which may be associated with a scale 237 designed for the purpose. In addition, however, the meter is altered so that its pointer 236 may serve as the pole element of a switch 238, of which the contact 238a thereof is connected to a lead 239 connected with a relay, such as Rm. The connection to the pointer is made by the way of a lead 240 connected to one side of the power line 80. The reversable motor MR1 of this showing is indicated as of the capacitor single-phase type, however the means for reversing the rotation of the same is identical with the last previous embodiment, that is by means of gaps identically operated by the relay Rm, which is also of the holding type as previously described. In parallel with the leads 239 and 240 is a circuit, such as the circuit 60 which included the switch 56 of the depth-bar of our first embodiment. Additionally, we provide a signal, such as a gong-signal 241, and connect the same serially in the lead 239. This lead is connected serially with one side of the circuit 60 of the switch 56 as shown. Connected to one side of the power line 81 is a circuit, such as 66, including a switch 65 which may be operated by a trigger 61, as in the case of our first embodiment. In operation, the instant device operates as follows:

After the main switch 81a has been closed, the device is brought forward to engage its element 16 with the thread to be inspected. Then the trigger-switch is closed to cause operation of the motor and subsequent rotation of the element 16 so that the latter may advance along the thread. If the thread be correct, that is not undersize to an appreciable degree, the indicator will rise along the scale 237 but not sufficiently to cause a closing of the switch 238, but, as the gauge-element reaches the depth at which the depth-bar engages the face of the work-piece, the switch 56 will be closed. This will cause the relay Rm to operate to close the gaps, such as 203 and 204, and reverse the motor to cause a withdrawal of the element 16. It will be understood that the rise of the pointer 236 along the scale 237 is effected in proportion with the angular displacement of the windings 218 and 219, and that this angular displacement or angular change between said winding is effected by the resisting torque on the spindle 15. The indication on the scale is a measure of the mutual inductance of said windings as they move toward alignment when the spring 295a is twisted by the resisting torque mentioned above.

Accordingly, with the above device, when the gauge element 16 meets with an undersize thread, the friction or resisting torque imposed on the spindle will cause a lag of the latter to cause the windings 218 and 219 to approach alignment. This will induce a current of sufficient strength to move the pointer to the limit of the scale and thus close the switch 238. This will operate the relay Rm to cause a reversal of the motor and a holding of the relay in the same way as previously operated by the switch 56 of the depth-bar. However, in this case, the current surge into the lead 239 will effect a temporary energization of the signal or gong 241 to give a warning to the operator that the thread is incorrect.

The embodiments of our invention hereinabove described are intended to be illustrative and not limitative of our invention since the same are subject to changes and modifications without departure from the scope of our invention, which we endeavor to express according to the following claims.

We claim:

1. In an apparatus of the character described, a portable frame, a spindle mounted in said frame and projecting therefrom and carrying at its outer end a thread-gauging element adapted for rotation and movement along the threads of nuts, bolts and the like; a shaft journalled in said frame for driving said spindle, a power device, means connected to said device and said drive shaft for transmitting the rotation of the power device to the shaft; selective means effective to cause the rotation to be transmitted to said shaft in one direction or the other; a lag-coupling for imparting the rotation of said drive shaft to said spindle; movable means responsive to the lag of said coupling; movable means responsive to the movement of the spindle when the latter is advanced along the threads; and means, rendered effective by either one of said movable means, for controlling said selective means in a manner to cause a reversal of the selected direction of rotation of said drive shaft.

2. For an automatic thread inspecting apparatus including a portable frame, an outwardly extending spindle mounted in said frame and carrying a gauging element adapted to move along the threads cut by means of a tap or die in a work piece, and having rotary driving means in said frame connected with a rotary power device including selective means for transmitting its rotary power to said rotary driving means in one direction or the other, in combination; a yieldable torque coupling between said spindle and said rotary driving means; a depth-bar movable by engagement of the same with the work piece; a trigger switch for initiating the operation of said apparatus; and means, operated by either the yield of the torque coupling or the movement of the depth-bar, for controlling said selective means to cause a reversal of the initially selected direction of rotation of said driving means.

3. For a thread gauging machine, including a movable frame, a spindle and a drive shaft, and a depth-bar movable relative to the frame when the latter is advanced toward the work piece, in combination; power means for imparting rotation to the drive shaft in either direction; a lagging coupling between said spindle and said drive shaft; distinctive signalling means normally ineffective; and means, operable by either the movement of said depth-bar or the lagging movement of said coupling, for controlling said power means and simultaneously rendering one of said signalling means effective to indicate which one of said movements has caused the operation of said means.

4. In a hand-held power device for gauging threads of the character described and including a driven shaft and a drive shaft associated with a reversible power means for rotating the same in one direction then the other, in combination: a coupling between said driven shaft and said drive shaft; an element in said coupling normally held stationary in said device but yieldably movable relative thereto when torque load is imposed upon said spindle in any one direction of rotation; and a universally mounted switch means in said device responsive to the movement of said element for causing the reversal of said power means regardless of which direction of rotation said power means was first rotated.

5. In a device for inspecting threads that are cut in work pieces, including a portable frame in which is mounted a spindle with a forward gauge element thereof for engagement with said work-pieces, a depth-bar, and means associated with said gauge element and said depth-bar for controlling a power device in a manner to cause a reversal of the direction of rotation of said spindle, in combination: circuit means including a pair of signals; a drive shaft; a power device; a lag coupling associated with said shaft for transmitting the rotation of the power device to the spindle; a switch in said circuit means operable to closed position by the lag of said coupling when a torque load is imposed upon the spindle; another switch in said circuit means, said switch being biased to open position and effective as such to hold the depth-bar in its most forward positions but closable against said bias as when said depth-bar is impinged against the work-pieces; a pair of clutches associated with the power device normally ineffective but each selectively operable to connect said power device with the said drive shaft in a manner to cause the latter to rotate in one or the other direction in accord with which one of said clutches is operatively connected with the power device; a master switch in said circuit; means for selecting one of said clutches for first operation in order to initiate a first direction of rotation of the drive shaft and spindle; and a trigger switch on the frame of said device for initiating the energization of said circuit means whereby the selected clutch will be engaged and the spindle rotated to cause either the switch operated by the lag-coupling or the switch operated by the depth-bar to close and effect a disengagement of the first clutch and a subsequent engagement of the other clutch and simultaneously cause one or the other of said pair signals to indicate which of said last mentioned switches has been operated to cause the reversal of the direction of rotation of the spindle by the operation of said clutches.

6. The combination in accord with claim 5, wherein said circuit means includes a pair of holding relays, one each associated with the switch of the said lag-coupling and the switch of said depth-bar; said holding relays being operable by their respective switches and effective to cause an uninterrupted operation of the said device after a change of engagement of the said clutches has occurred, and also effective to cause a complete recycling of said clutches and associated parts after the said trigger switch has been released to deenergize the said circuit means.

7. For a hand-carried power-operated thread-gauging device, in combination: a frame; a spindle journalled in said frame including a gauging element thereof extending outwardly of the frame; a drive shaft in substantial alignment with said spindle; power means selectively arranged for rotating said shaft in any first, then reverse second direction of rotation; a single manipulative switch for initiating the operation of said power means; a depth-bar on said frame and a switch device associated therewith and closable thereby for causing said power means to reverse and operate in said second direction; a coupling between said spindle and said drive shaft including a yielding element thereof movable in response to torque load imposed upon said spindle in either direction; a second switch device closable by the yielding movement of said element for causing a sooner reverse of said power means; signalling means on said frame; and means, responsive to the closing of one or the other of said switch devices, for rendering said signalling means effective to indicate which one of said switch devices has caused the reversal of the said power means.

JOHN R. PATTEE.
CHESTER W. VERMILYEA.

REFERENCES CITED

The following references are of record in the file of this patent:

UNITED STATES PATENTS

| Number | Name | Date |
|---|---|---|
| 1,403,170 | Kind | Jan. 10, 1922 |
| 1,701,423 | Sauveur | Feb. 5, 1929 |
| 1,880,405 | Broecker | Oct. 4, 1932 |
| 1,916,138 | Clute et al. | May 23, 1933 |
| 1,979,731 | Burge et al. | Nov. 6, 1934 |
| 2,005,891 | Elberty | June 25, 1935 |
| 2,141,465 | Grey | Dec. 27, 1938 |
| 2,380,841 | Heckethorn | July 31, 1945 |
| 2,387,047 | Weiss | Oct. 16, 1945 |
| 2,433,235 | Panish | Dec. 23, 1947 |